US008983231B2

(12) United States Patent
Sagan et al.

(10) Patent No.: US 8,983,231 B2
(45) Date of Patent: Mar. 17, 2015

(54) METHOD AND DEVICE FOR READING A PHYSICAL CHARACTERISTIC ON AN OBJECT

(75) Inventors: Zbigniew Sagan, Rueil-Malmaison Cedex (FR); Alain Foucou, Rueil-Malmaison Cedex (FR); Jean-Pierre Massicot, Rueil-Malmaison Cedex (FR)

(73) Assignee: Advanced Track & Trace, Rueil-Malmaison (FR)

( * ) Notice: Subject to any disclaimer, the term of this patent is extended or adjusted under 35 U.S.C. 154(b) by 994 days.

(21) Appl. No.: 12/997,828

(22) PCT Filed: May 26, 2009

(86) PCT No.: PCT/FR2009/000606
§ 371 (c)(1),
(2), (4) Date: Feb. 17, 2011

(87) PCT Pub. No.: WO2010/004101
PCT Pub. Date: Jan. 14, 2010

(65) Prior Publication Data
US 2011/0135160 A1    Jun. 9, 2011

(30) Foreign Application Priority Data

Jun. 12, 2008   (FR) ..................................... 08 03281

(51) Int. Cl.
*G06K 9/36*     (2006.01)
*G06K 9/32*     (2006.01)
(Continued)

(52) U.S. Cl.
CPC .......... *G06K 9/3216* (2013.01); *G06K 9/00577* (2013.01); *G06K 9/6857* (2013.01); *G06K 2009/0059* (2013.01); *G07D 7/12* (2013.01); *G07D 7/2008* (2013.01); *G07D 7/2033* (2013.01)
USPC ....................................................... 382/286

(58) Field of Classification Search
None
See application file for complete search history.

(56) References Cited

U.S. PATENT DOCUMENTS

| 5,673,338 | A  | 9/1997 | Denenberg et al. |
| 6,584,214 | B1 | 6/2003 | Pappu et al. |

(Continued)

FOREIGN PATENT DOCUMENTS

| WO | 9119614 A1    | 12/1991 |
| WO | 2006016114 A1 | 2/2006 |

(Continued)

OTHER PUBLICATIONS

Musman et all, Automatic Recognition of ISAR Ship Images, IEEE 1994.*

(Continued)

*Primary Examiner* — Mark Roz
(74) *Attorney, Agent, or Firm* — Young & Thompson

(57) ABSTRACT

A method for reading a physical characteristic on an object includes:
  a step (240, 315, 405) of capturing a first image of at least a portion of the object with a first resolution;
  a step (245, 320, 415, 420) of determining the position of an area of the object to be processed, according to the first image;
  a step (255, 330, 430) of capturing a second image of the area of the object to be processed, with a second resolution higher than the first resolution; and
  a step (260, 335, 440) of determining the physical characteristic based on the second image. In some embodiments, there is, in addition, a step of marking the object with a mark bearing information representative of at least a portion of the physical characteristic.

16 Claims, 6 Drawing Sheets

Figure 1:
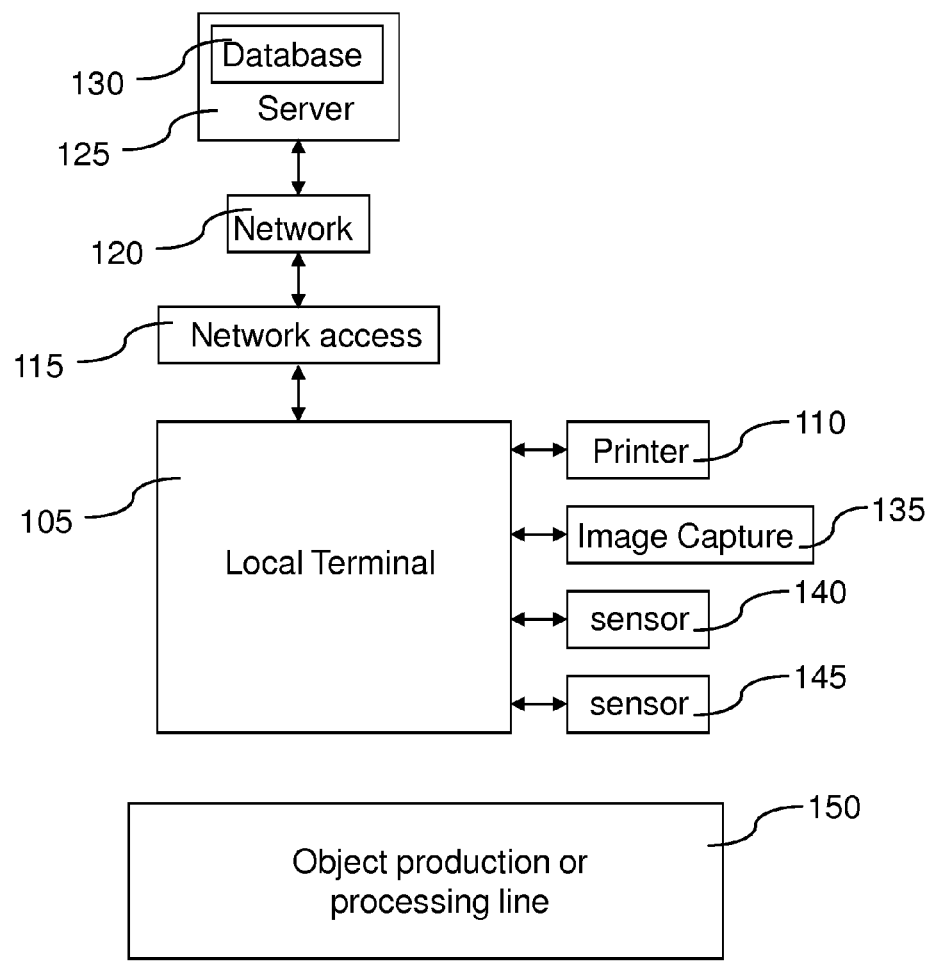

(51) Int. Cl.
*G06K 9/00* (2006.01)
*G06K 9/68* (2006.01)
*G07D 7/12* (2006.01)
*G07D 7/20* (2006.01)

(56) References Cited

U.S. PATENT DOCUMENTS

| | | | | |
|---|---|---|---|---|
| 7,156,311 B2* | 1/2007 | Attia et al. | ............... | 235/462.46 |
| 8,320,695 B2* | 11/2012 | Park | ............... | 382/255 |
| 2002/0180759 A1* | 12/2002 | Park et al. | ............... | 345/629 |
| 2003/0128876 A1* | 7/2003 | Yamaguchi | ............... | 382/190 |
| 2006/0062427 A1 | 3/2006 | Burkhart et al. | | |
| 2006/0244826 A1* | 11/2006 | Chew | ............... | 348/143 |
| 2007/0183652 A1* | 8/2007 | Backstrom et al. | ............... | 382/154 |

FOREIGN PATENT DOCUMENTS

| | | |
|---|---|---|
| WO | 2007028799 A1 | 3/2007 |
| WO | 2008107525 A2 | 9/2008 |

OTHER PUBLICATIONS

A. Ali, S. Gilani, Affine Normalized Invariant Feature Extraction using Multiscale Gabor Autoconvolution, IEEE 2006.*
International Search Report, dated Nov. 17, 2009, from corresponding PCT application.

* cited by examiner

METHOD AND DEVICE FOR READING A PHYSICAL CHARACTERISTIC ON AN OBJECT

BACKGROUND OF THE INVENTION

The present invention relates to a method and a device for reading a physical characteristic on an object.

It aims in particular to solve counterfeit and gray market problems and generally, a problem of identification and/or authentication of any object, particularly a product, a document, for example an identification document, packaging or banknotes. More specifically, the present invention envisages a system to facilitate the registration of an object's unitary imprint during the object's manufacturing phase and to facilitate the extraction of the imprint during the object's identity and authenticity verification phase.

DESCRIPTION OF THE RELATED ART

Fibrous objects (paper, cardboard) and the majority of metal, plastic, coated paper or other objects have, at the microscopic level, a structure random in nature. In the same way as biometric techniques that use the unique structures forming the hand or iris imprints for identification or identity verification purposes were developed for humans, techniques can be devised to measure the unique microscopic characteristics that objects have, so as to identify or authenticate them.

There is currently no known physical process that can reproduce this random structure. In addition, it has been shown that macroscopic deformations, such as wrinkling paper or spraying water thereon, do not alter these microscopic properties significantly. Thus, the majority of objects naturally possess characteristics that allow them to be characterized in a manner that is unique, not reproducible, and negligibly affected by time and wear.

In operation, an object can be identified by extracting its characteristics and searching a database for the object that has the characteristics most similar to those of the object to be identified. If the identification is not found, the object is considered unknown (or "illegitimate" if the only legitimate objects are those objects listed in the database). It is noted that the database search can be expensive and that it must be optimized if a large number of objects are stored. In contrast, if the characteristics of the object, as measured at the time of registration, are associated with it, for example as a barcode printed on the object, the authenticity of the object can also be checked without resorting to database.

Document U.S. Pat. No. 6,584,214 describes how the three-dimensional structure of a material can be measured and digitized for authentication and identification purposes. Patent application WO2006016114 (Ingenia Technology) divulges the use of the technology called LSA, or "Laser Surface Authentication": a laser beam is sent onto the surface from which an imprint is to be extracted and sensors capture the light from the laser beam that is reflected in different directions, depending on the orientation of the local microscopic surface. The value of this signal, which depends on the local properties of the material, is therefore unique. The probability that two surfaces have similar imprints is negligible. Note that during the registration phase, which is preferably performed automatically for economic reasons, the objects travel at high speed on a conveyor in front of the laser source. Since only one portion of the product surface can be processed, the same portion of the object must necessarily be captured during a product's subsequent identification or verification phase. It is noted that the capture of imprints is very sensitive to positioning problems; a positioning error of just one millimeter can invalidate the reading.

These techniques have disadvantages. Their implementation is usually expensive and fragile. Consequently, these techniques are difficult to exploit. Furthermore, they significantly complicate the imprint registration phase. For example, in the case of packaging, it has to be sent to the center where it is registered, usually on the technology supplier's premises. The complexity and cost of this phase is thus a major obstacle to the adoption of this technology.

Authentication technology is all the more useful if it can be used by a large number of participants (customs inspectors, distributors, police officers, retail outlets or even end consumers), to detect counterfeits at any time. However, exploitation of the technology is limited by the cost (and hence scarcity), size and weight of reading devices, making "on-site" reading difficult if not impossible.

In general, only a small portion of the surface of an object is processed. If the area used for the extraction of an imprint is not specified, only people having been told the precise position of this area will be able to extract the signature. In the context of trademark protection, however, the positions of the processed areas would have to be known for a very large number of products; this is not possible, even for an inspector or customs officer trained for this purpose.

In addition, these techniques have a very low tolerance to positioning errors: a shift of one millimeter or a rotation of one degree may be enough to cause the extracted characteristics not to correspond to the characteristics measured at the time of registration. Reading is therefore a very delicate procedure that should primarily be conducted in the laboratory.

Consequently, these technologies are still mainly limited to forensic use, which reduces their value considerably.

Patent application WO 2007/028799 describes a method for identifying objects by capturing a digital image of the microstructure of its surface. The invention makes use of a standard image capture system to extract a unique description of an object, allowing it to be identified using a database. This invention therefore solves some of the problems of the prior art described above, including the cost and availability of means of capturing the imprint.

However, the difficulties of positioning the object are not addressed in that document. Since only a small portion of the surface of the object can be registered, the registered position must be known to the user of the object. As mentioned earlier, however, this is not possible in the field of trademark and design protection, as this position would have to be known for a very large number of objects. Assuming the position of the imprint on the object were known, very high positioning accuracy would be required to extract an identification imprint to be correlated with imprints determined during the registration of the objects. That document also describes a technique that requires only the position of a reference point. However, the capture must always be precisely adjusted to this reference point, and the positioning problem is not solved.

It must be noted that positioning problems may also apply when reading an invisible mark applied to a product. Indeed, if the mark is ideally printed on the whole product so as to be readable regardless of the position of the captured surface, in practice only a portion of the surface of the product can be marked as the digital images of the invisible marks would otherwise be very large in size. For example, to entirely mark a product with an area of 15×15 cm and an invisible marking defined at 2,400 dpi, a digital image of over 200 million pixels would have to be generated. One or more images covering only a fraction of the surface of the product are therefore generated, raising the problem of determining the areas of the image to be captured.

SUMMARY OF THE INVENTION

The present invention aims to remedy all or part of these disadvantages.

According to a first aspect, the present invention envisages a method for reading a physical characteristic on an object, characterized in that it comprises:
- a step of capturing a first image of at least one portion of said object with a first resolution,
- a step of determining the position of an area of the object to be processed, according to said first image,
- a step of capturing a second image of said area of the object to be processed, with a second resolution higher than said first resolution and
- a step of determining said physical characteristic based on said second image.

Thus, implementing the present invention can reduce or eliminate the problems of technologies using costly and impractical means of capture, while being compatible with low-end means of digital image capture, e.g. flatbed scanners, image sensors in digital cameras or mobile phones and industrial cameras. The price of these image capture means has declined in step with their production in increased quantities. Moreover, the quality of image capture has significantly improved. Most flatbed scanners can now capture images at an optical resolution of 2,400 dpi (acronym for "dots per inch"—samples per inch), which allows an accuracy of up to 10 microns. Genuine portable electron microscopes connected to a general purpose computer are available at moderate prices. Industrial cameras can acquire high quality images at resolutions that can be very high while numerous objects pass in front of them at high speed. Some cameras, called "linear" cameras because their sensor is linear, can acquire a continuous image, without resorting to capture activation using sensors.

In particular, the implementation of the present invention allows the positioning of the area of interest where the physical characteristic is read when registering object imprints to be stabilized and standardized. It is noted that, among the physical properties read by the implementation of the present invention, are the local characteristics of the material for processing a unique imprint of the object and the marks printed or formed by a material marking process.

According to particular features, during the step of determining the position of the area of the object to be processed, the position of at least one characteristic point of the object is determined, then the position of the area to be processed in relation to each said characteristic point of the object is determined. Each characteristic point can be on the contour of the object, for example by being a corner.

According to particular features, during the step of determining the position of the area of the object to be processed, the position of at least one characteristic line of the object is determined, then the position of the area to be processed in relation to each said characteristic line of the object is determined. Each characteristic line may be on the contour of the object, for example by being an edge, or within the area of the object in the image, for example by representing a sharp edge.

According to particular features, the method that is the subject of the present invention, as described in brief above, comprises a step of detecting the arrival of said object. For example, a sensor placed at the level of a path of the objects on a conveyor triggers the capture and/or image processing of an object.

According to particular features, the method that is the subject of the present invention, as described in brief above, comprises a step of marking the object with a mark bearing information representing at least one portion of said physical characteristic. For example, the mark is a two-dimensional barcode or an anti-copy mark representing this information.

According to particular features, during the step of determining a physical characteristic, said physical characteristic is linked to a local structure of the object's surface in the area of the object to be processed.

According to particular features, during the step of determining the position of the area of the object to be processed, a query is sent to a database, said query comprising the positions of characteristic points and/or lines of the object; information on the object's shape and on the position of the area to be processed in said object's shape is returned from the database. Thus, unsorted objects of different shapes can be processed, recognizing them by inquiring from a database of object shapes and areas to be processed.

According to particular features, the step of determining the position of the area of the object to be processed includes a step of determining at least one printed mark position, a step of capturing an image of at least one said mark and a step of reading information represented by said mark and representing the position of the area to be processed. Thus, objects whose areas to be processed are in different positions but identified in at least one mark printed on the object can be processed.

According to particular features, during the step of determining at least one printed mark position, a query is sent to a database, said query comprising the positions of characteristic points and/or lines of the object; information on the object's shape and on the position of each printed mark in said object's shape is returned from the database. Thus, unsorted objects of different shapes can be processed by retrieving the position of each mark by inquiring from a database of object shapes and marks to be read.

According to particular features, the method that is the subject of the present invention, as described in brief above, comprises a step of sending the physical characteristic to a database. The physical characteristics of different objects can thus be stored in one or more databases, e.g. a database by object type or by owner of the intellectual property rights relating to said objects.

According to particular features, the method that is the subject of the present invention, as described in brief above, comprises a step of comparing said physical characteristic to physical characteristics stored in said database and of determining which of the previously stored physical characteristics is most similar to the new physical characteristic sent to the database. The present invention therefore applies not only to registering the physical characteristics of objects during manufacturing, but also to the identification of objects in circulation. The present invention therefore fights the gray market, i.e. selling in a non-authorized market an object legally sold in another market.

According to particular features, during the step of determining the position of the area of the object to be processed, a position that is located on the inside of the object once manufactured is determined. The inventor has effectively determined that the outside of a packaging box is frequently coated, whereas the interior is generally not coated. The absence of coating, however, facilitates the determination of a physical characteristic representative of the local structure of the box surface, since coatings render the state of the surface uniform. In general, a resolution of about 8,000 to 12,000 dpi is required to extract a physical characteristic typical of a coated surface; however, this resolution is difficult to achieve during high-speed registration or capture using a flatbed scanner. It is noted that, during the manufacture of a box, it is formed as a volume only late in the process, after printing, cutting and gluing.

According to particular features, during the step of capturing a first image of the object, the object's speed of passage is used and, during the step of determining the position of the area to be processed, a moment is determined for the capture of the second image. Thus, in the case of image capture using a linear sensor, the image deformation due to the speed of the object can be compensated for and the capture of the second image can be triggered when the area to be processed passes at the level of an image sensor.

According to particular features, during the step of determining a physical characteristic, the second image is rotated beforehand. The relative angular position of the objects processed in turn is thus compensated for.

According to particular features, during the step of determining a physical characteristic, a frequency transform is performed (Fourier, DCT). In this way, the number of coefficients to be processed to identify an object and to be stored can be reduced (by removing high-frequency coefficients that are not significant).

According to particular features, during the step of determining the physical characteristic, a hashing function is applied to the physical characteristic and the result, or "hash", of this hashing function is associated with the physical characteristic. Use of this hash allows a physical characteristic to be found very quickly.

According to particular features, during the step of determining a physical characteristic, a physical characteristic of the object is determined. For example, the physical characteristic is composed of irregularities in the material or in the surface of the object or of a printed mark, is a Cryptoglyph (registered trademark) or a mark designed to detect a copy, e.g. a Seal Vector (registered trademark).

According to a second aspect, the present invention envisages a device for reading a physical characteristic on an object, characterized in that it comprises:

- a means of capturing a first image of at least one portion of said object with a first resolution,
- a means of determining the position of an area of the object to be processed, according to said first image,
- a means of capturing a second image of said area of the object to be processed, with a second resolution higher than said first resolution and
- a means of determining said physical characteristic based on said second image.

As the particular characteristics, advantages and aims of this device are similar to those of the method that is the subject of this invention, as described in brief above, they are not repeated here.

BRIEF DESCRIPTION OF THE DRAWING FIGURES

Figure 2:
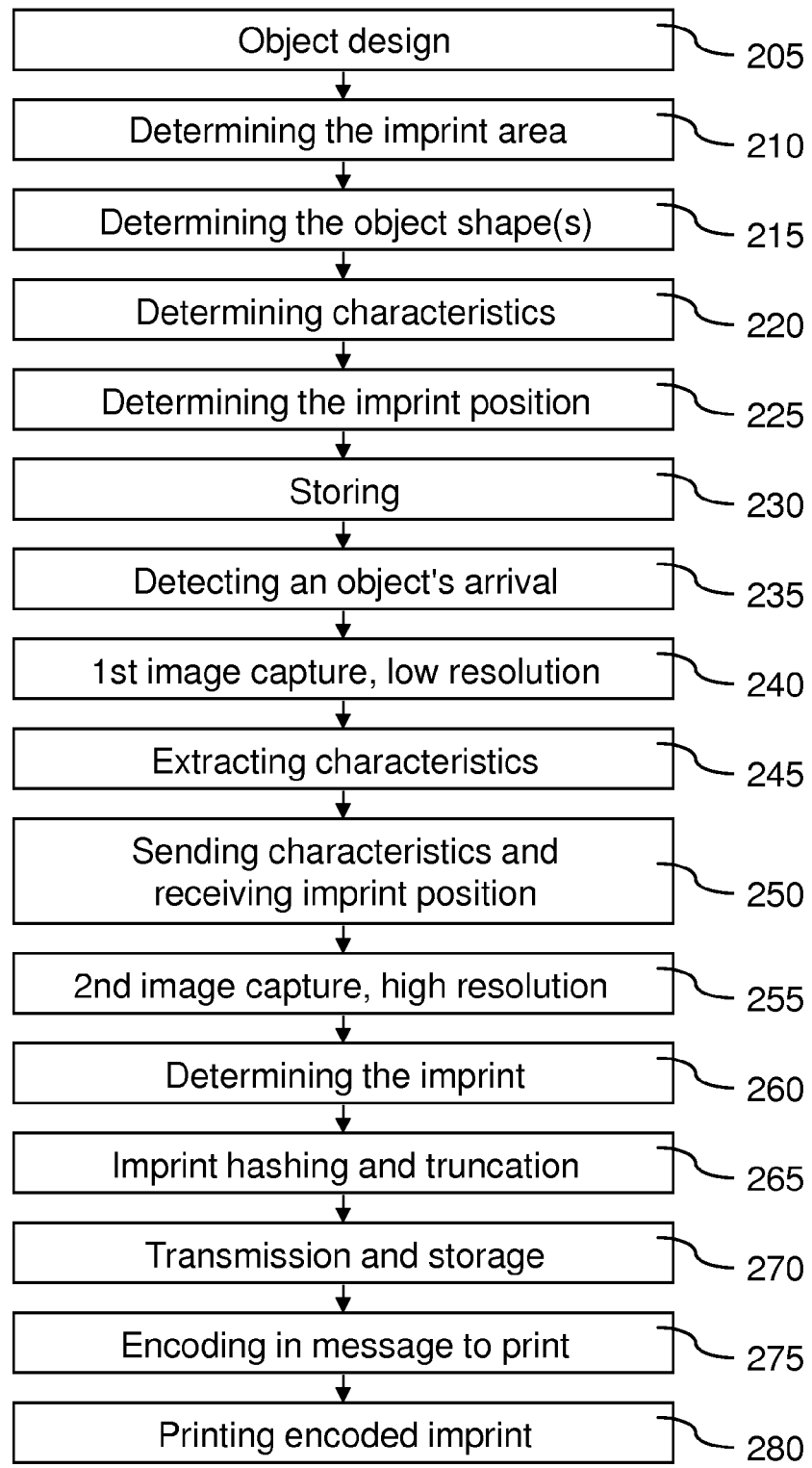
Figure 3:
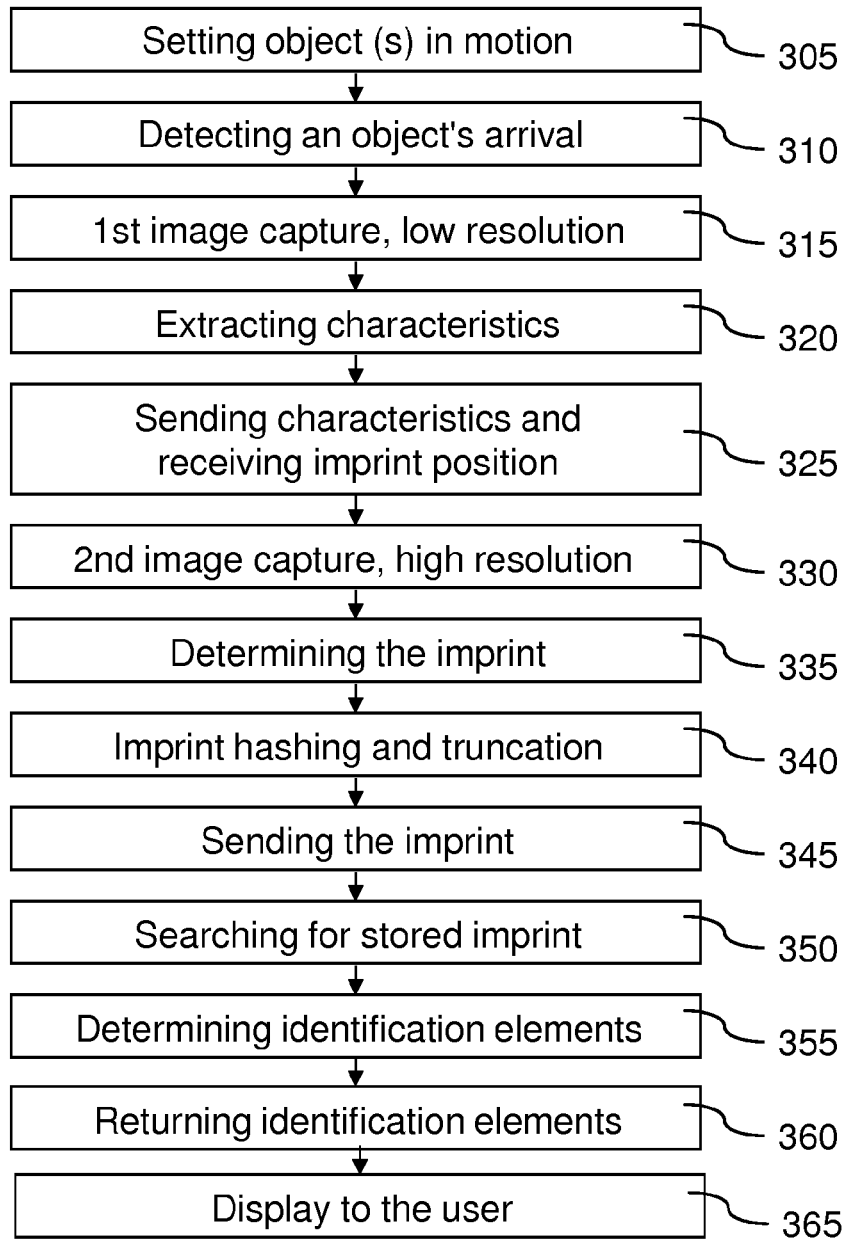
Figure 4:
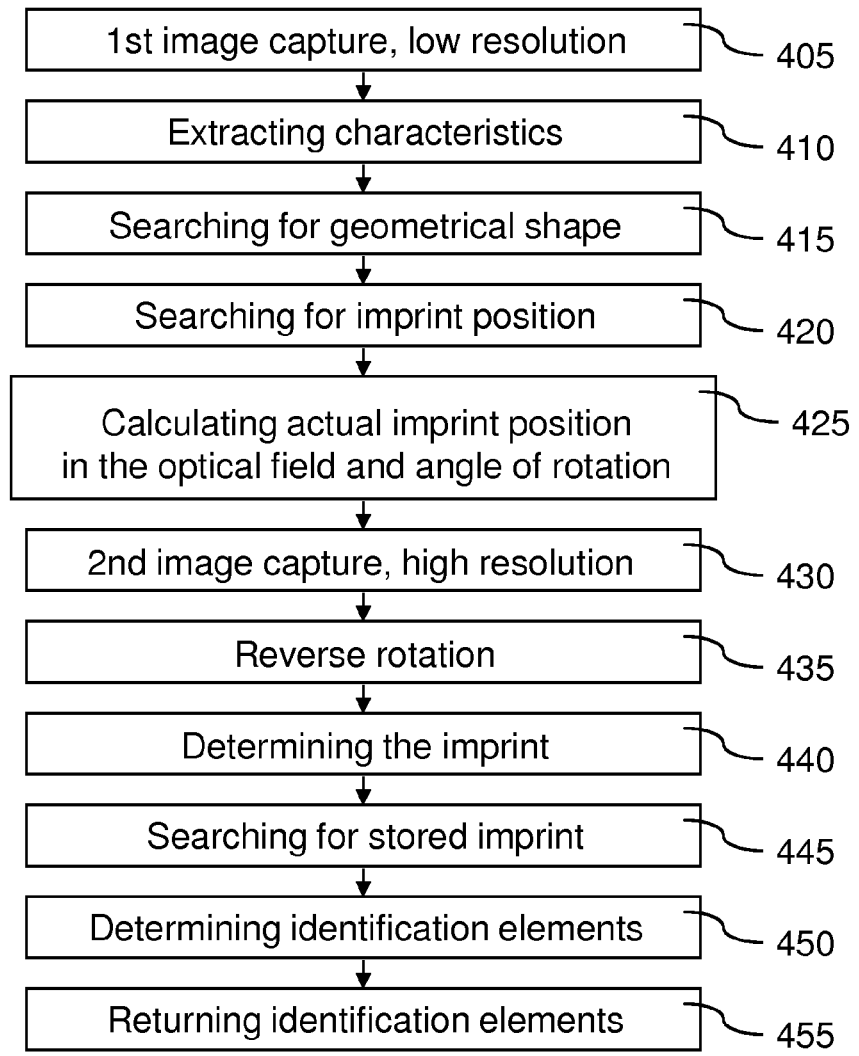
Figure 5:
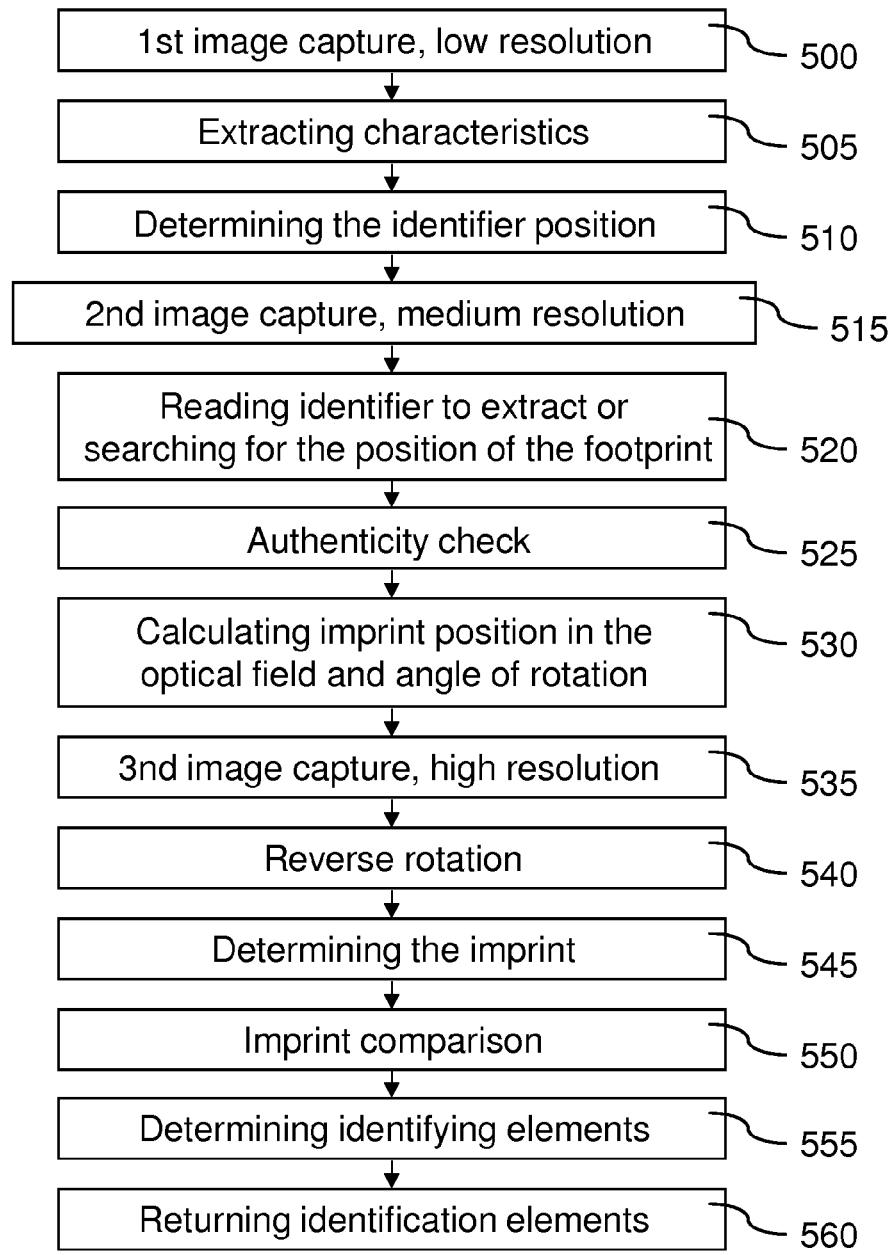
Figure 6:
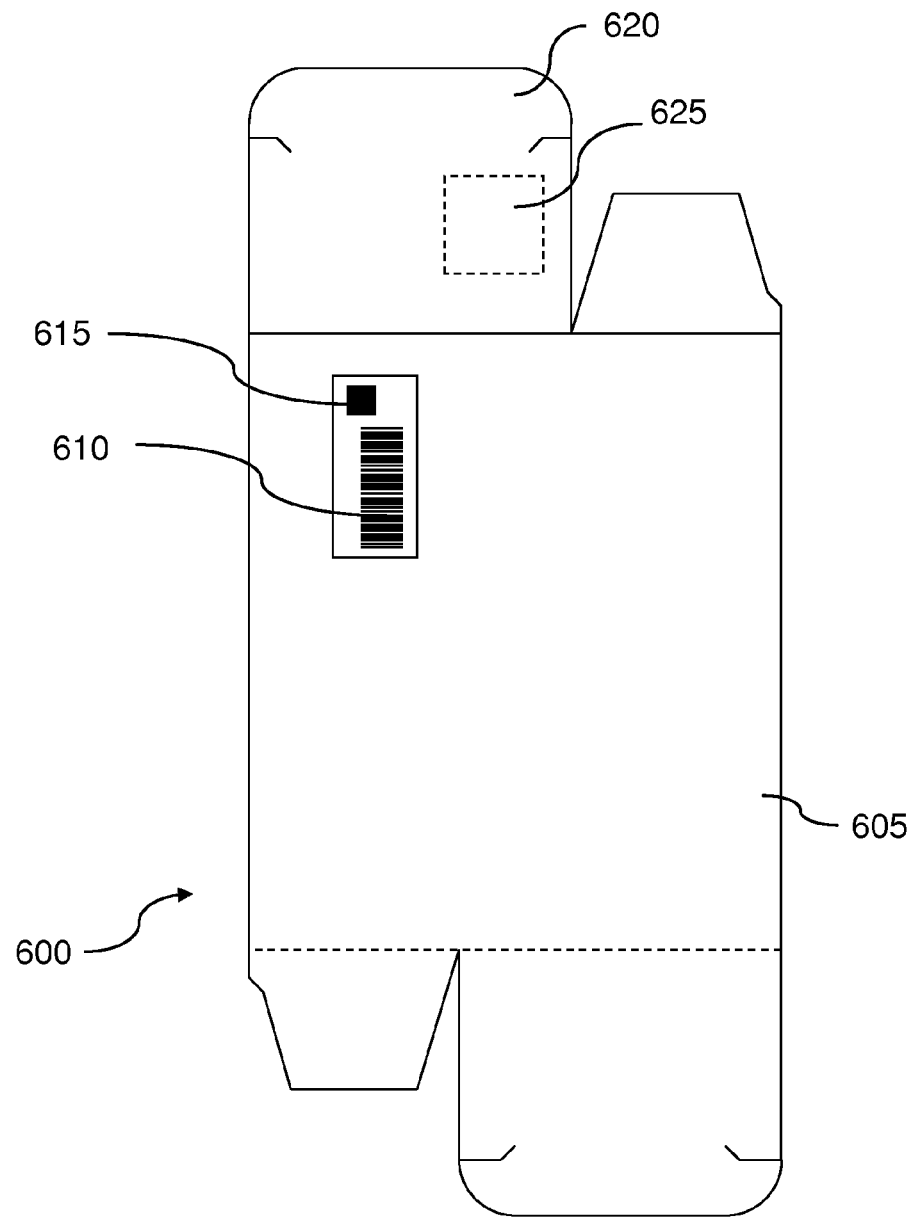

Other advantages, aims and characteristics of the present invention will become apparent from the description that will follow, made, as an example that is in no way limiting, with reference to the drawings included in an appendix, in which:

FIG. 1 represents, schematically, a first particular embodiment of the device that is the subject of this invention, FIG. 2 represents, in the form of a logical diagram, steps in a first particular embodiment of the method that is the subject of this invention, FIG. 3 represents, in the form of a logical diagram, steps in a second particular embodiment of the method that is the subject of this invention, FIG. 4 represents, in the form of a logical diagram, steps in a third particular embodiment of the method that is the subject of this invention, FIG. 5 represents, in the form of a logical diagram, steps in a fourth particular embodiment of the method that is the subject of this invention and FIG. 6 illustrates an object bearing means for the implementation of the method that is the subject of this invention.

DETAILED DESCRIPTION OF THE INVENTION

The whole description which follows is limited to cases where the physical characteristic is an imprint, i.e. it is unique and allows the object to be identified. The present invention however, is not limited to this type of physical characteristic but, on the contrary, extends to structures of the material, printed marks and material markings that may not be unique.

FIG. 1 shows a local terminal 105 equipped with a printer 110, image capture means 135, two sensors 140 and 145 and means 115 to access a network 120 to which server 125 is connected. The server 125 is equipped with a database 130.

The local terminal 105 is, for example, a general purpose computer. It is installed on an object production or processing line 150, for example for packaging. The line 150 comprises, for example, a flat object unstacker (not shown) and a conveyor (not shown) that moves the objects to be processed, one behind the other.

The sensor 140 is positioned on the production line 150, upstream of the optical field of the image sensor 135 and is designed to detect the arrival of an object to be processed. For example, the sensor 140 is an optical cell comprising a transmitter and a receiver of light beams. The sensor 145 is placed on the line 150 and determines the speed of objects on this line. For example, the sensor 145 is connected to a controller (not shown) governing the operation of the line 150 or is connected to a base for moving objects, such as a conveyor belt. The local terminal 105 controls the printing of the objects by the printer 110, in a manner known per se, for example by ink-jet or laser marking. The means of access 115 to the network 120 is, for example, a known type of modem for accessing the network 120, for example the Internet.

The image capture means 135 is, for example, a digital camera, a linear sensor or an industrial camera.

The server 125 is of a known type. The database 130 holds at least a list of object identifiers and of imprints linked to these objects, determined in accordance with the method of the present invention. Preferably, this database 130 holds, in conjunction with each object identifier, an object type and imprint area position determination identifier for this object type, an identifier of the provider performing the production or processing.

The terminal 105 holds a software application that, during its execution, implements steps of a method for reading an object imprint that is the subject of the present invention. The server 125 holds a software application that, during its execution, implements the steps of an imprint storage and recognition method.

Alternatively, the terminal 105 does not host a specific software application but uses a web browser and web service hosted on the server 125.

The description of the operation of the first embodiment of the method of reading object imprints that is the subject of the present invention follows, with reference to the steps illustrated in FIG. 2.

In a step 205, an object type is designed, for example a new package.

In a step 210, each position will be determined of an area on the object from which an imprint or information representing the position of such an area will be read.

In a step 215, the shape or shapes that the object may take in an image taken by the image sensor 135 is determined (e.g. the front or back side of a package can be seen before folding).

In a step 220, the characteristic points or lines of the object, in the shapes it may take, are determined.

In a step 225, the position of each said area within each shape seen is determined.

In a step 230, the result of steps 215 to 225 is stored, for example in the database 130, for each type of object.

In a step 235, the arrival of the object near or in the image sensor's field of vision is detected. The speed of the object is then measured and, depending on this speed and the distance between the location of detection of the object's arrival and the end of the sensor's field of vision, the duration to wait before capturing the image of the object is determined. There then follows a wait for this duration.

In a step 240, a first image of the object is captured, with a first resolution.

In a step 245, image processing of the object is performed to extract the characteristic contour, lines or points, e.g. the straight edges or angles on the contour.

In a step 250, the image processing result is sent to the server; in return, the server determines and sends a position of an imprint area and a position of a message to be printed area within the visible shape of the object, based on this result. For example, the message to be printed takes the form of a two-dimensional barcode.

In a step 255, an image of the imprint area is captured at a second resolution higher than the first resolution. In a step 260, an imprint of the object is determined according to known techniques, either from the local structure of the material in the imprint area, or from the deterioration of an anticopy mark during its printing. For example, a Fourier or discrete cosine transform is applied to the detected structure or to the anti-copy mark's matrix of printing errors. Possibly, a quantization of the values is performed to compress the binary representation. Preferably, a hashing of the imprint thus determined is performed and, optionally, a truncation of the hash resulting from the hashing is performed in a step 265.

In a step 270, the imprint and the hash are sent to the server; the server inserts these values into the database, together with other object identification elements (manufacture date and location, destination market, object type, serial number, etc.)

In a step 275, either the imprint or its hash and the position of the imprint area are encoded to produce a message to be printed. For example, an encoding known as "Datamatrix" (registered trademark) is performed.

In a step 280, the encoded data is printed in the area of the message to be printed.

Thus, in a particular embodiment, prior to registration:
the general shape of the object is determined or received;
the macroscopic nature of the surface, e.g. coated or not or front or back side, is determined or received,
optionally, one or more reference points of the object are determined or received;
optionally, surface uniqueness properties for different parts of the object are determined or received and
from the general shape of the object and macroscopic content of the surface and, optionally, from the reference points and surface uniqueness properties, the imprint capture position on the object is determined.

At the time of registration, for each object:
the passage of one end of the object, or of one or more points of the object, is detected,
the position of the imprint area is determined, or the instant of image capture is calculated,
the image is stored,
optionally, the imprint is calculated and
optionally, at least a subset of the imprint is marked onto the object.

In embodiments, the random structure of the object's surface is used to generate a unique imprint, using standard image capture means.

Before describing an application of the present invention to the identification of packages, it is pointed out that, generally, packaging boxes are printed on sheets of cardboard or plastic printed in flexography. The prepress imposition step allows the package design to be arranged as many times as possible on the plate to be realized so as to minimize the waste of unused cardboard. Once printed, the cartons are placed in a machine that cuts them into boxes. Generally, the boxes must then be transported to the product's assembly location that may be in an assembly plant.

In this application specific to packaging identification, it is preferable that the imprint be made when the box is cut, for example at the assembly plant. This ensures that only legitimate products are approved. The imprint can be calculated on the cut box or on the closed box after passage through the folder-gluer.

Paper and cardboard have a wealth of surface defects, which can be captured from a relatively low resolution image capture, for example of 2,400 dpi. However, when a coating is applied to a carton, the coating layer masks the paper's surface defects. The coated surfaces themselves have surface defects of a random nature. However, the size of these defects is smaller, and a high resolution image (e.g. up to 10,000 dpi) is required to capture them. The front of a packing box is frequently coated, but, on the contrary, the back of the unfolded box (i.e. the inner surface when the box is folded) is generally not coated. It is therefore preferable to capture an image of the back (corresponding to the inner part of the closed package) of the box to extract the imprint. On the other hand, a printed mark representing the position of the imprint can be borne on the front or the back of the box.

The description of the operation of a second embodiment of the method of reading object imprints that is the subject of the present invention follows, with reference to the steps illustrated in FIG. 3.

In a step 305, said object is put in motion, for example on a conveyor with a digital image sensor, optical position sensors and a computer for controlling, processing and communicating with the server.

In a step 310, the arrival of the object near or in the image sensor's field of vision is detected. The speed of the object is then measured and, depending on this speed and the distance between the location of detection of the object's arrival and the end of the sensor's field of vision, the duration to wait before capturing the image of the object is determined. There then follows a wait for this duration.

In a step 315, a first image of the object is captured, with a first resolution.

In a step 320, image processing of the object is performed to extract the characteristic contour, lines or points, e.g. the straight edges or angles on the contour.

In a step 325, the image processing result is sent to the server; in return, the server determines and sends a position of an imprint area and a position of a message to be printed area within the visible shape of the object, based on this result. For example, the message to be printed takes the form of a two-dimensional barcode.

In a step 330, an image of the imprint area is captured at a second resolution higher than the first resolution. In a step 335, an imprint of the object is determined according to known techniques, either from the local structure of the material in the imprint area, or from the deterioration of an anti-copy mark during its printing. For example, a discrete Fourier transform is applied to the detected structure or to the anti-copy mark's matrix of printing errors. Preferably, a hashing of the imprint thus determined is performed and, optionally, a truncation of the hash resulting from the hashing is performed in a step 340.

In a step 345, the imprint and the hash are sent to the server. In a step 350, the server looks for the stored imprint and/or hash that most closely match(es) the sent imprint and/or hash, according to known database search techniques.

In a step 355 the object's identifying elements associated with the result of the search step 350 are determined (manufacture date and location, destination market, object type, serial number, etc.)

In a step 360, these identification elements are returned to the computer utilized to verify the images and, in a step 365, these elements are displayed to their user, for example on the computer screen.

Known techniques of the prior art can be used to determine the imprint from the captured image, for example the application of low-pass filtering to eliminate noise and less important details. The image frequency can be transformed, for example by a DCT or FFT type transform. The number of coefficients needed to represent the imprint can then be greatly reduced.

Methods developed in biometrics for storing a secure hash can be adapted. For example, two-level quantifiers are used to store a biometric imprint as a hash, allowing it to be retrieved very quickly.

It is noted that, in some embodiments, a general purpose computer associated with a flatbed scanner is used. Flatbed scanners are convenient image capture tools for capturing imprints, because they can capture a large area with a relatively high resolution. However, if the user is allowed to place the object to be checked in an arbitrary position on the scanner, it is generally not feasible to capture the entire area (typically A4 size) because this takes a long time (several minutes) and uses a large amount of memory. Moreover, it is preferable in general to avoid the scanners' user interfaces, since they contain a host of user-adjustable settings that can affect image quality: the likelihood of incorrect setting is significant, even for experienced users.

To solve these problems, in embodiments, the scanner is utilized and the imprint area to be captured is determined automatically from a lower-resolution image that allows the imprint's position to be determined. To control the scanner, the generic "Twain" (registered trademark) interface can manage all of the scanner's settings.

In the third embodiment, shown in FIG. 4, the geometric shape of the object is used to locate the position of the imprint:

in a step 405, at least a large part of the back surface of the packaging is captured at low resolution,
in a step 410, the boundaries of the object are determined and optionally the object's reference point,
in a step 415, based on the object's boundaries and, optionally on reference points, the database is searched for the object's geometric shape,
in a step 420, based on the object's geometric shape, the associated stored position of the imprint area is determined,
in a step 425, the actual position of the imprint area within the scanner's capture field and the image's angle of rotation are calculated,
in a step 430, the imprint area thus determined is captured at high resolution,
in a step 435, optionally, a rotation inverted in relation to the rotation determined in step 425 is performed,
in a step 440, the imprint is determined within the area captured at high resolution,
in a step 445, the imprint database is searched for the corresponding imprint,
in a step 450 the object's identifying elements associated with the result of the search step 445 are determined (manufacture date and location, destination market, object type, serial number, etc.) and
in a step 455, these identification elements are returned to the computer used to control the images.

In the fourth embodiment, illustrated in FIG. 5, a message stored in an identification (and/or authenticating) code is used to locate the position of the imprint:

Using a 2D, or 1D in particular, barcode as an identifier is advantageous, because 1D barcodes are very easily detected and their orientation precisely measured, thanks to the very strong polarization of the image gradient due to the alternating uni- or bi-directional black and white areas.

in a step 500, an image of at least a large part of the surface of the packaging is captured at a first resolution, called "low" resolution,
in a step 505, the boundaries of the object or at least one reference point are determined,
depending on the variants, this image comprises the identifier which is then read or, in a step 510, the position of an object identifier (e.g. a one- or two-dimensional barcode) is determined and in a step 515, an image of said identifier is captured at a second resolution, called "medium", which is higher than the first resolution,
in a step 520, said identifier is read to extract the position of the imprint in the document, either locally by decoding / decrypting the identifier, or remotely by querying a database associating identifiers with imprint positions,
optionally, if the identifier code is also an authenticator, in a step 525, the code's authenticity is checked (optionally an image is then captured at high resolution), and if it is, step 530 follows,
in a step 530, the position of the imprint area within the imaging field and the angle of rotation of the imprint are calculated, based on:
the imprint's position, scale factor and rotation angle in the document either as stored in memory or as determined based on by the identifier and
the position of at least one reference point of the document within this imaging field,
in a step 535, an image of part of the package is captured at a third resolution called "high", which is equal to or higher than the first resolution and preferably greater than or equal to the second resolution, corresponding to the position determined in step 520, preferably on the back of the document (corresponding to the inside of the packaging),
optionally, in a step 540, the reverse rotation of the imprint image is performed, in a step 545, the imprint of the document in the captured image is determined, possibly after reverse rotation, in a step 550, the imprint database is searched for the imprint thus determined or this imprint is compared with the encrypted imprint content, stored in the identifier code, in a step 555 the object's identifying elements associated with the result of the search step 550 are determined (manufacture date and location, destination market, object type, serial number, etc.) and in a step 560, these identification elements are returned to the computer used to control the images.

In a variant, the two embodiments described with reference to FIGS. 4 and 5 are combined.

FIG. 6 shows an object 600, here a glued and flattened package with a printed and coated outer part 605 and an uncoated inner part 620. The outer part 605 is so named because, when the packaging contains the product that it is intended to protect and/or identify, it is on the outside. Conversely, in this same configuration, the inner part 620 is located on the inside of the package.

The outer part 605 bears a barcode 610 and a mark designed to enable the detection of a copy 615, i.e. its appearance is significantly modified when a copy of the package is produced. The barcode 610 represents information that identifies the position of the mark 615 and the position of an area of interest 625 where the elements for determining a physical characteristic of the object, such as an imprint, are located.

As may be understood, in accordance with the present invention, from a low resolution image of the object 600, the position of the area of interest comprising the mark 615 is determined as well as that of the area of interest 625 in which an imprint can be determined, possibly after reading the information content of the barcode 610. Once the positions of these areas of interest are known, a higher-resolution image of each of these is captured and by processing this image, a physical characteristic is determined, e.g. the content of the mark 615 and the imprint borne by the area of interest 625.

The techniques described hereinabove can be used to facilitate the reading of an invisible numeric code such as a Cryptoglyph or Seal Vector, a copy-protected information matrix, and the specific imprint caused by printing these codes.

The invention claimed is:

1. A method for reading a physical characteristic on a document, which comprises:
    a step of capturing a first image of at least a portion of said document with a first resolution;
    a step of determining a position of an area of the document to be processed, according to said first image;
    a step of capturing a second image of said area of the document to be processed, said second image being captured at a second resolution higher than said first resolution; and
    a step of determining said physical characteristic based on said second image,
    wherein the step of determining the position of the area of the document to be processed comprises a step of decoding information represented by a code printed on the document, said information locating the position of the area to be processed, the area to be processed being different than the area containing the code printed on the document, and
    wherein during the step of capturing the second image, the second image of said area of the document to be processed is captured at the position of said area located by the decoded information.

2. A method according to claim 1, wherein, in the step of determining the position of the area of the document to be processed, the position of at least one characteristic point of the document, then the position of the area to be processed in relation to each said characteristic point of the document are determined.

3. A method according to claim 1, wherein, in the step of determining the position of the area of the document to be processed, the position of at least one characteristic line of the document, then the position of the area to be processed in relation to each said characteristic line of the document are determined.

4. A method according to claim 1, further comprising a step of detecting the arrival of said document.

5. A method according to claim 1, further comprising a step of marking the document with a mark bearing information representative of at least a portion of said physical characteristic.

6. A method according to claim 1, wherein, in the step of determining a physical characteristic, said physical characteristic is linked to a local structure of the surface of the document in the area of the document to be processed.

7. A method according to claim 1, wherein the step of determining the position of the area of the document to be processed include:
    a step of determining at least one printed code position,
    a step of capturing an image of said at least one code, and
    a step of reading information coded in said at least one code and locating from the read information the position of the area to be processed.

8. A method according to claim 7, wherein, during the step of determining at least one printed code position, a query is sent to a database, said query comprising the positions of characteristic points and/or lines of the document; information on the document's shape and on the position of each printed code in said document's shape is returned from the database.

9. A method according to claim 7, further comprising a step of transmitting the physical characteristic to a database.

10. A method according to claim 9, further comprising a step of comparing said physical characteristic to physical characteristics stored in said database and of determining which of the previously stored physical characteristics is most similar to the new physical characteristic sent to the database.

11. A method according to claim 1, wherein, in the step of determining the position of the document area to be processed, a position located on an inside of the document once manufactured an object having an inside with said document.

12. A method according to claim 1, wherein, in the step of capturing a first image of the document, the document's speed of passage is used and, during the step of determining the position of the area to be processed, a moment is determined for the capture of the second image.

13. A method according to claim 1, wherein, in the step of determining a physical characteristic, the second image is rotated beforehand.

14. A method according to claim 1, wherein, in the step of determining the physical characteristic, a hash function is applied to the physical characteristic and the resulting hash of this hash function is associated with the physical characteristic.

15. A method according to claim 1, wherein, in the step of determining a physical characteristic, a physical characteristic of the document is determined.

16. A device for reading a physical characteristic on a document, which comprises:
- means for capturing a first image of at least one portion of said document with a first resolution;
- means for determining a position of an area of the document to be processed, according to said first image;
- means for capturing a second image of said area of the document to be processed, with a second resolution higher than said first resolution; and
- means for determining said physical characteristic based on said second image,
- wherein the means of determining the position of the area of the document to be processed comprises
  - i) a means of capturing an image of a code printed on the document, and
  - ii) a means of decoding information represented by said code, said information locating the position of the area to be processed, the area to be processed being different than the area containing the code printed on the document, and
- wherein the means of capturing the second image captures the second image of said area of the document to be processed at the position of said area located by the decoded information.

* * * * *